(12) United States Patent
Natvig (10) Patent No.: US 7,356,736 B2
(45) Date of Patent: Apr. 8, 2008

(54) SIMULATED COMPUTER SYSTEM FOR MONITORING OF SOFTWARE PERFORMANCE

(75) Inventor: Kurt Natvig, Royken (NO)

(73) Assignee: Norman Asa, Lysaker (NO)

( * ) Notice: Subject to any disclaimer, the term of this patent is extended or adjusted under 35 U.S.C. 154(b) by 248 days.

(21) Appl. No.: 10/255,566

(22) Filed: Sep. 25, 2002

(65) Prior Publication Data

US 2003/0135791 A1 Jul. 17, 2003

Related U.S. Application Data

(60) Provisional application No. 60/325,026, filed on Sep. 25, 2001.

(51) Int. Cl.
*G06F 11/00* (2006.01)

(52) U.S. Cl. .............................. 714/38; 726/24; 726/25

(58) Field of Classification Search .................. 714/28, 714/38; 713/200
See application file for complete search history.

(56) References Cited

U.S. PATENT DOCUMENTS

| | | | | |
|---|---|---|---|---|
| 5,398,196 | A | * | 3/1995 | Chambers .................... 714/28 |
| 5,623,600 | A | * | 4/1997 | Ji et al. ........................ 713/201 |
| 5,696,822 | A | * | 12/1997 | Nachenberg ................ 713/200 |
| 5,765,030 | A | * | 6/1998 | Nachenberg et al. ......... 714/33 |
| 5,832,208 | A | * | 11/1998 | Chen et al. .................. 713/201 |
| 5,842,002 | A | * | 11/1998 | Schnurer et al. .............. 703/21 |
| 6,067,410 | A | * | 5/2000 | Nachenberg .................. 703/28 |
| 6,775,780 | B1 | * | 8/2004 | Muttik ......................... 726/24 |
| 6,851,057 | B1 | * | 2/2005 | Nachenberg ................ 713/200 |
| 7,093,239 | B1 | * | 8/2006 | van der Made ............. 717/135 |
| 2002/0083334 | A1 | * | 6/2002 | Rogers et al. .............. 713/200 |
| 2002/0162015 | A1 | * | 10/2002 | Tang ........................... 713/200 |

OTHER PUBLICATIONS

PCT publication No. WO/0206928.*
Lee et al. "A generic virus detection agent on the internet." Proceedings of the Thirtieth Hawaii International Conference on System Sciences. Jan. 7-10, 1997, vol. 4, pp. 210-219.*
VMWare Express Product Information.*

* cited by examiner

*Primary Examiner*—Robert Beausoliel
*Assistant Examiner*—Philip Guyton
(74) *Attorney, Agent, or Firm*—Townsend and Townsend and Crew LLP (57) ABSTRACT

A system S is defined which is capable of simulating a computer (virtual computer, VC) for the purpose of software performance monitoring. The system is implemented as a set of software modules (SM) that can be exchanged to change the behavior of the VC. The VC is driven by a CPU emulator, and can run any operating system (virtual operating system, VOS) that is supported by the available SM's. The system is designed to log accesses to system resources and the nature of these accesses. The system is particularly useful for determining whether an executable or file contains an unknown virus, with a very low risk of false positives. Detected viruses include encrypted, polymorphic, metamorphic and other virus types.

6 Claims, 3 Drawing Sheets

Method M illustration. This shows how a program $P_{test}$ is evaluated in the VC.

SIMULATED COMPUTER SYSTEM FOR MONITORING OF SOFTWARE PERFORMANCE

CROSS-REFERENCES TO RELATED APPLICATIONS

This application claims the benefit of U.S. Provisional Application No. 60/325,026 filed Sep. 25, 2001 which is herein incorporated by reference for all purposes.

BACKGROUND OF THE INVENTION

The present invention relates generally to the field of computer virus detection and prevention software, and more particularly to emulator-based antivirus software in which a file is executed in a simulated computer in order to reveal possible damaging effects. The simulated computer described herein may also be used for other kinds of software testing.

Computer viruses typically work by making copies of themselves and in some manner attaching the copies to other executable programs. The copies can be exactly similar to the original, they can be encrypted with a small, static decryptor that unpacks the virus at runtime, or they can be polymorphic. Polymorphic viruses are either encrypted with a changing decryptor, or they are truly polymorphic in the sense that the code in the virus itself is shuffled around.

Computer worms also make copies of themselves, but they do not attach to other programs. Instead they attempt to spread, primarily by network connections, to other computers.

A trojan horse program does not make copies of itself, but instead attempts to perform some action of which the user on the particular machine would not approve. This can range from deleting files to disclosing sensitive information like passwords and user documents.

In the field of detecting computer viruses and other malicious software a limited amount of techniques have historically been used, including for example, stringscanning, checksum mapping, integrity checking, behavior blocking and heuristic analysis.

Stringscanning

Perhaps the most well known detection technique is string-scanning, where the detecting program (hereafter called the antivirus program) searches inside a possibly infected executable program (hereafter called $P_{test}$) for a sequence of bytes known to exist in a virus.

Ex:
Clean DOS COM program:
E8 06 00 B4 4C CD 21 CD 20 B4 09 . . .
Infected DOS COM program:
91 B4 4E BA 38 01 CD 21 73 01 C3 B8 02 3D 99 B2.

In this case, it would be sufficient to look for the byte sequence in bold to be able to determine that $P_{test}$ was actually overwritten with a variant of the Trivial virus. This technique has proven very useful over the years and is still in use.

Checksum Mapping

A variation on this technology is not to look for the specific sequence of bytes, but to instead use a checksumming algorithm (typically CRC) on the bytes in $P_{test}$ in order to verify whether the checksum or system of checksums found matches the checksums connected with a known virus. The benefit of this approach is that the search time can be significantly reduced, since the algorithms involved would typically be table lookups instead of sequential compare actions.

The two previous methods are pattern-matching methods to detect viruses that are already known. That means that the antivirus program knows what to look for in a file. A great challenge today, however, is to detect unknown viruses, worms and trojans. A few methods have been developed for this purpose as well:

Integrity Checking

Integrity checking systems detect modification of files and systems after the modifications have taken place. This technique will detect possible detrimental effects, but not stop them.

Behaviour Blocking

Behavior blocking systems monitor attempts to change files and systems at runtime. This method may stop damaging actions, but requires the target to be actually run, i.e. that the instructions in $P_{test}$ are executed on the real CPU. When running $P_{test}$ there is always a possibility that something can go wrong.

Heuristics

An heuristic analysis-type antivirus program examines $P_{test}$ for indications as to whether an unknown computer virus may be present. The antivirus program can do this by using the classical pattern-matching algorithms to detect virus fragments or code that is often found in viruses (passive heuristics), or it can attempt to emulate $P_{test}$ and examine whether $P_{test}$ performs, or may perform, actions that can be damaging (active heuristics). The present invention in certain aspects is an extension to the latter category, active heuristics.

BRIEF SUMMARY OF THE INVENTION

The present invention provides systems and methods for detecting virus programs in a simulated computer environment. One rationale behind the approach of the present invention is based on the fact that prior virus detection methods are either dependent on knowing the actual virus or virus fragments, dependent on detecting the virus's effects as it is run in a real computer system, or dependent on relying on vague security rules to block an emulated attempt at damaging actions. There is always the possibility that an unknown virus goes undetected or manages to perform an action causing some damaging effect before it is stopped, and there is a notable risk of false alarms.

The present invention eliminates, or substantially reduces, these risks by simulating the execution of the virus in a totally simulated and controlled environment. From the virus' view, it seems to be running in a normal computer environment. When the virus looks for files to infect on the hard disk, it finds virtual files on a virtual hard disk, and it writes a copy of itself to these files. An antivirus program according to the present invention can then safely declare $P_{test}$ to be infected because it has logged that the virus attached to $P_{test}$ will write itself to a known file in the simulated system. Similarly, if a destructive target program erases all files on the simulated hard disk, the antivirus program can then safely declare that the target is destructive without ever running the risk of letting the target actually execute.

According to an aspect of the present invention, a simulated virtual computer system is provided for testing the performance of a program, wherein the virtual computer system executes on a real computer system. The virtual computer system typically includes a CPU emulation module, a first plurality of software modules that simulate hardware devices in the virtual computer system, a second plurality of software modules that simulate software executing in the CPU emulation module in the virtual computer system, and a system kernel module that manages the virtual computer system environment. The program to be tested is executed in the virtual computer system, and the system kernel logs accesses to the resources simulated by the first and second plurality of software modules.

According to another aspect of the present invention, a computer-implemented method of testing a program in a virtual environment is provided for determining whether the program includes damaging software or a virus. The method typically includes providing a virtual computer system in a real computer system, the virtual computer system including software modules for simulating resources including hardware devices and software, and executing a program under test, $P_{test}$, in the virtual computer system until a stop condition occurs. the method also typically includes determining whether a simulated resource has been written to or accessed, and if so, reassigning $P_{test}$ to be at least a portion of a simulated resource that was written to or accessed, and thereafter re-executing $P_{test}$ in the virtual computer system until a stop condition occurs. the method also typically includes determining whether re-execution of $P_{test}$ causes a similar action or whether the virtual computer is unbootable, wherein if both steps of determining show the same or a similar result, the program under test is identified as including a virus, wherein if the virtual computer is unbootable upon re-execution, the program under test is identified as including damaging software, and wherein otherwise the program under test is identified as not containing damaging software or a virus.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE DRAWINGS

DETAILED DESCRIPTION OF THE INVENTION

The present invention provides a system to execute a computer program in a fully simulated computer and monitor the performance of the program. A method is also provided to detect computer viruses or other damaging software by examining the effects the program had on the simulated computer.

Figure 1:
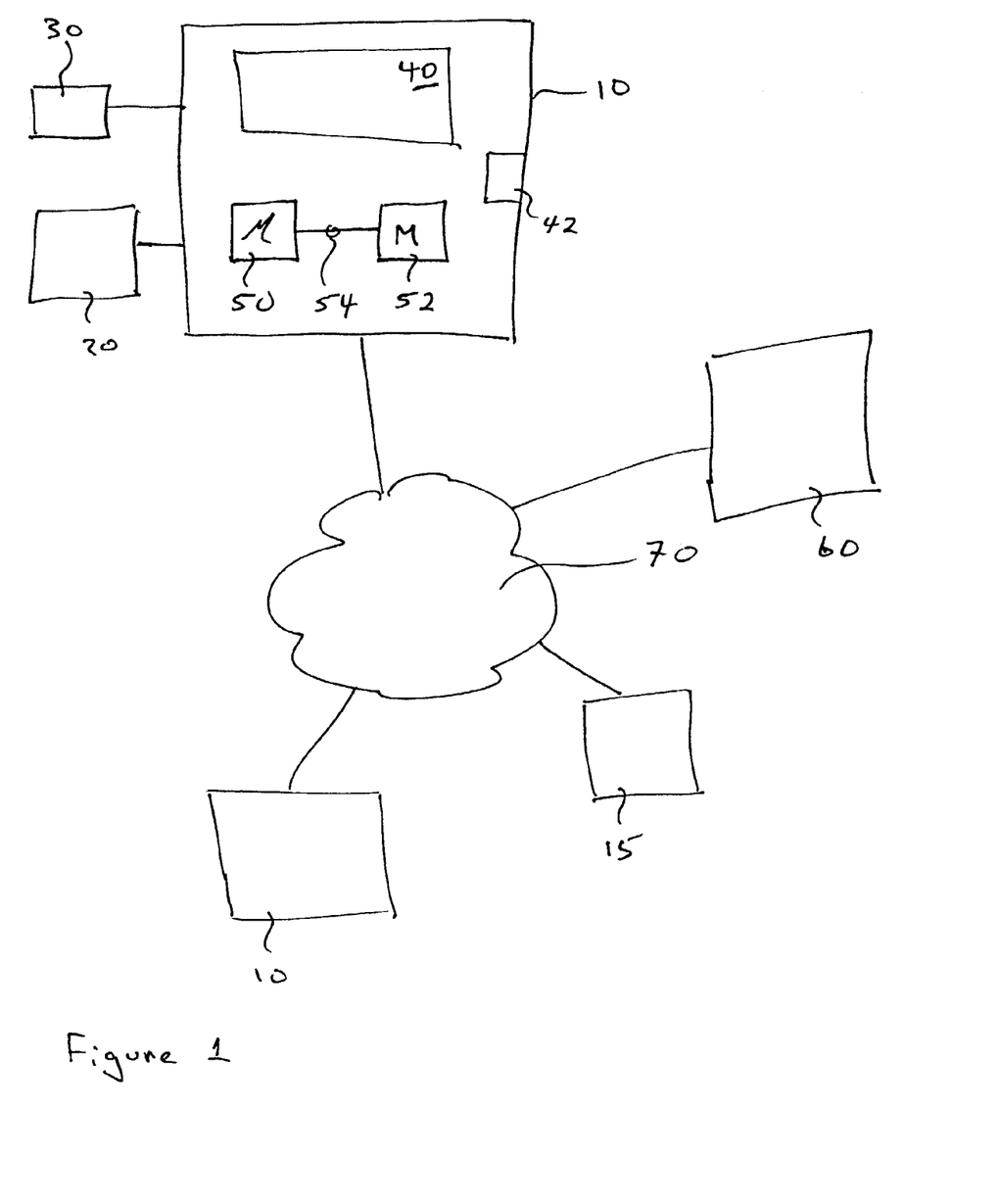
FIG. 1 illustrates a computer system configured with a simulation application module according to an embodiment of the present invention.

FIG. 1 illustrates a computer system 10 configured with a simulation application module 40 (also referred to herein as, for example, "virtual system" or "virtual CS" or "system") according to the present invention. Client computer system 10 may operate as a stand-alone system or it may be connected to server 60 and/or other client systems 10 and devices 15 over a network 70.

Several elements in the system shown in FIG. 1 include conventional, well-known elements that need not be explained in detail here. For example, computer system 10 could include a desktop personal computer, workstation, laptop, or any other computing device capable of executing simulation module 40. In client-server or networked embodiments, a client system 10 is configured to interface directly or indirectly with server 60, e.g., over a network 70, such as a LAN, WAN, the Internet, etc., and/or directly or indirectly with one or more other client systems 10 and devices 15, e.g., over network 70. Client system 10 typically runs a browsing program, such as Microsoft's Internet Explorer, Netscape Navigator, Opera or the like, allowing a user of client system 10 to access, process and view information and pages available to it from server system 60 or other server systems over Internet 70. Client system 10 also typically includes one or more user interface devices 30, such as a keyboard, a mouse, touchscreen, pen or the like, for interacting with a graphical user interface (GUI) provided on a display 20 (e.g., monitor screen, LCD display, etc.). Although not necessary to the execution of application module, network communication operates as a means to transmit and receive messages and code including portions or all of application module 40 as well as messages or code including one or more programs for which testing in the simulated environment provided by application module 40 is desired. In one embodiment, in local network embodiments, network interconnection via a LAN is preferred, however, it should be understood that other networks can be used, such as the Internet or any intranet, extranet, virtual private network (VPN), non-TCP/IP based network, LAN or WAN or the like.

Returning to FIG. 1, according to one embodiment, computer system 10 and some or all of its components are operator configurable using a simulation module 40, which includes computer code executable using a central processing unit 50 such as an Intel Pentium processor or the like coupled to other components over one or more busses 54 as is well known. Computer code including instructions for operating and configuring client system 10 to create, monitor and control a virtual computer environment (virtual computer system), test programs in the virtual computer system, and render optional GUI images as described herein is preferably stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. An appropriate media drive 42 is provided for receiving and reading documents, data and code from such a computer-readable medium. Additionally, the entire program code of module 40, or portions thereof, may be transmitted and downloaded from a software source, e.g., from a server system or computing device to computer system 10 over the Internet as is well known, or transmitted over any other conventional network connection (e.g., extranet, VPN, LAN, etc.) using any communication medium and protocols (e.g., TCP/IP, HTTP, HTTPS, Ethernet, etc.) as are well known. It should be understood that computer code for implementing aspects of the present invention can be implemented in a variety of coding languages such as C, C++, Java, Visual Basic, and others, or any scripting language, such as VBScript, JavaScript, Perl or markup languages such as XML, that can be executed on computer system 10 and/or in a client server or networked arrangement. In addition, a variety of languages can be used in the external and internal storage of data, e.g., logging accesses to virtual resources, and other information, according to aspects of the present invention.

According to one embodiment, simulation application module 40 includes instructions for creating, monitoring and controlling virtual computer system environment, as well as providing user interface configuration capabilities, as described herein. Application 40 is preferably downloaded and stored in a memory 52 (e.g., a hard drive or other memory such as a local or attached RAM or ROM), although application module 40 can be provided on any software storage medium such as a floppy disk, CD, DVD, etc. as discussed above. In one embodiment, application module 40 includes various software modules that simulate hardware devices and software, such as for example modules that simulate hard disk and floppy storage devices, IO and memory managers, file systems and files, user input devices, network communication devices, operating systems and related software, etc.

Figure 2:
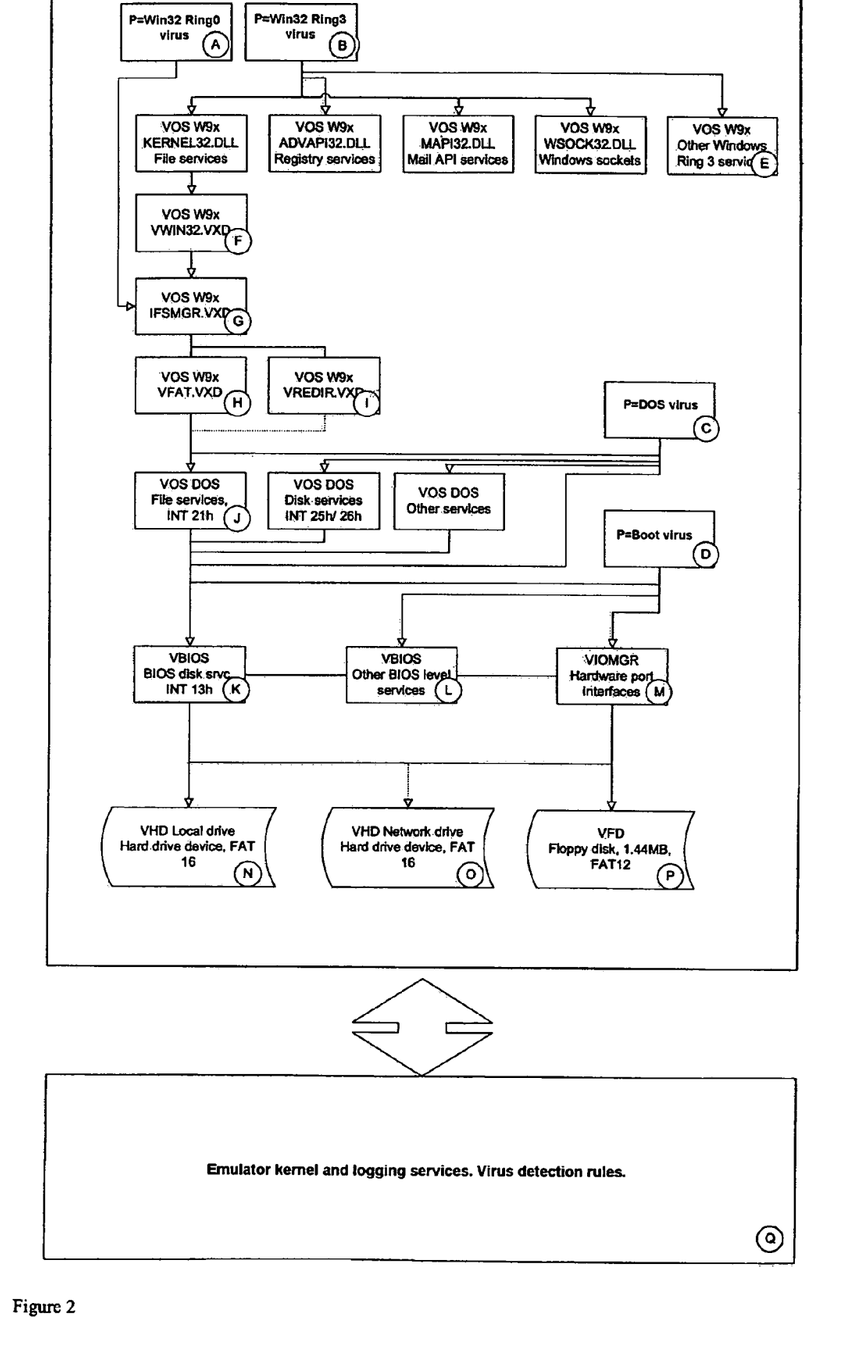
FIG. 2 shows a schematic of a virus detection system S, according to an embodiment of the present invention.
Figure 3:
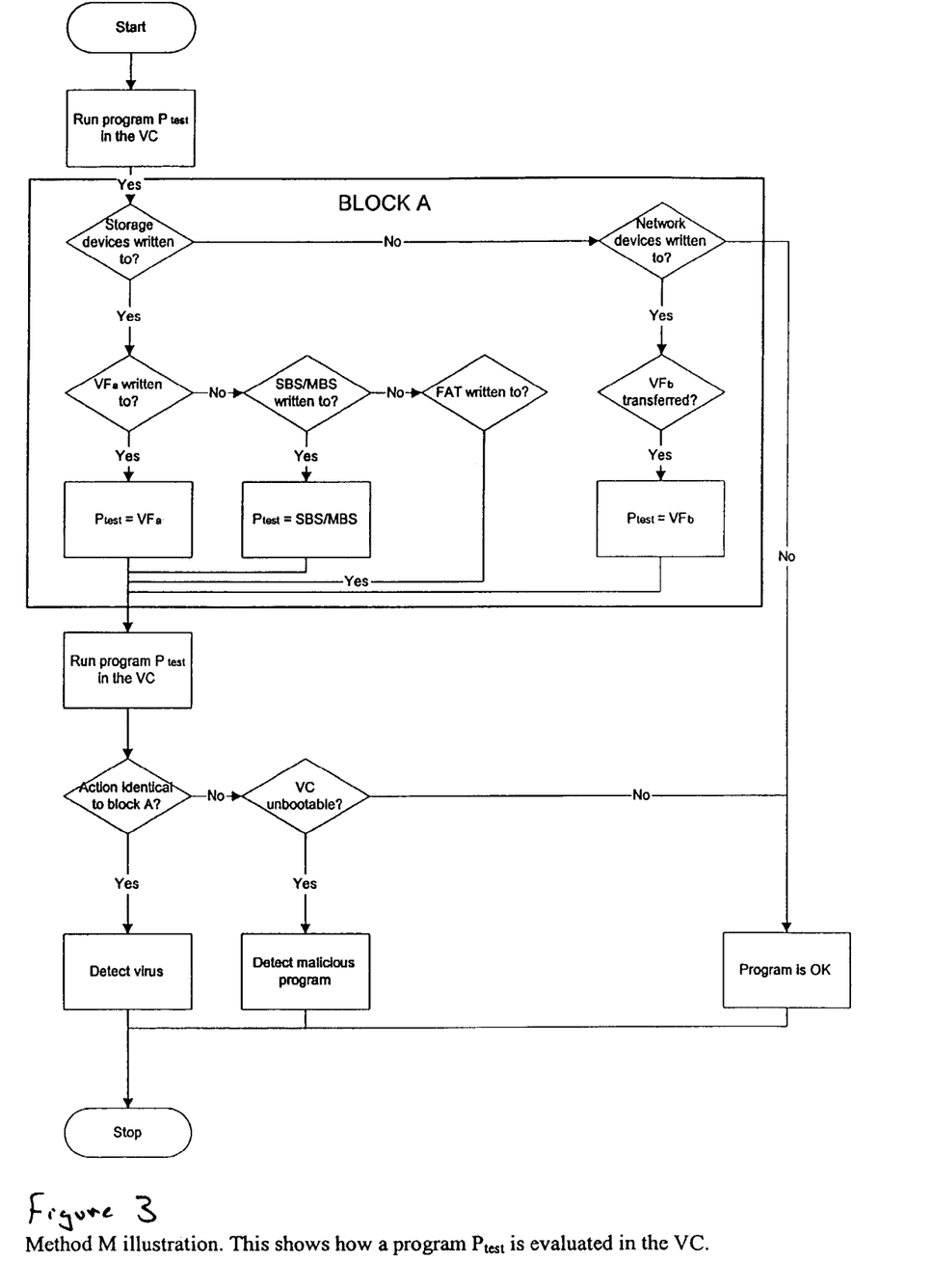
FIG. 3 illustrates the process of analyzing a program according to one embodiment of the present invention.

FIG. 2 shows a schematic of a virus detection system S, according to an embodiment of the present invention. S, in one embodiment, is a tool to detect computer viruses. The setup is here described for DOS, boot and 32-bit Windows viruses, however, it is not intended to be limited to these platforms, but these are the platforms in most extensive use today.

Components A, B, C and D, marked in dark grey in the FIG. 2, are items to be examined for virus infection, and are copied to the VC from a real environment at the time of examination. VC, denoting Virtual Computer, in this setting generally means a software program that behaves like a real hardware computer. White components are components that are integral parts of the VC, and are preferably present in the antivirus definition file and dynamically loadable from there on request. These components all preferably notify the system S kernel (Q) about requests that pass through them. The system S kernel governs this process and logs all actions that take place in the VC. Preferably, this component is fixed and a code change is required to change its functionality. The suspect files A, B & C exist in a normal storage medium (e.g., a hard disk). The representation of a boot virus (D) does not exist as a file, but as a system sector on the storage medium.

When these objects are scanned for viruses, a copy is made of the file (or sector) and this copy is moved into an emulated virtual computer. This copy is hereafter referred to as the tested program $P_{test}$, whereas the original program is referred to as $P_{org}$. $P_{test}$ is executed as it would be on a normal computer, except that the execution is performed inside a virtual computer VC and does not really take place. $P_{test}$ is executed until it meets a stop condition. Stop conditions include:

Natural program termination of $P_{test}$;

Emulator error, i.e. emulator encounters an unknown/ unprocessable instruction;

If emulated exception handler is installed, emulated program triggers emulated recursive exceptions, e.g., recursion level>10;

If no emulated exception handler is installed, emulated program triggers exception;

If emulated program triggers other predefined stop conditions—like certain sequences of actions; and If emulation of program $P_{test}$ executions times out according to predefined timeout values The virtual environment changes depending on the format of the emulated program $P_{test}$. This change is initiated by the emulated program loader, which detects the format of $P_{test}$. Virus program formats include Windows ring 0 executables, Windows ring 3 executables, DOS executables and Boot sectors, which are each described below with reference to program code elements A, B, C and D, respectively, from FIG. 2.

A: A Windows ring 0 executable is a program that acts like one of the core components of Windows. It has more extensive rights than a ring 3 application, but is also largely cut off from using the libraries available to ring 3 applications. Instead is has to relate to the functions available to ring 0 applications; mainly those provided by the Windows kernel drivers (E-I). Whenever such a program is examined, or a virus takes action to move itself from ring 3 to ring 0, the virtual environment changes to reflect this. That is, if a virus modifies the descriptor tables in order to gain ring 0 privilege, it modifies the virtual descriptor tables and that way gains ring 0 privilege in the VC. The code that constitutes the virus is as such first emulated as ring 3 code and then emulated as ring 0 code, exactly reflecting how the code would be run on a real CPU.

B: Windows ring 3 executables are common programs that use the extensive Windows libraries to work. These libraries are present as DLL's (.dll)—files that contain functionality available for programs. The program operates as a normal 32-bit application, the standard way for Windows programs to work. Whenever such a file is tested for viruses, the virtual environment will not only contain basic functionality and DOS services, but also emulated Windows DLL's will be present (E) as virtual files on the VHD. These DLLs export functions available to emulated programs. In structure, the emulated Windows DLLs are not different from standard Windows DLLs, but they are specifically designed for the system S. This means that many functions that are unimportant for virus detection (such as user interface functionality) are preferably just empty dummy functions, and other functions have added functionality such as issuing event notification to the SK. Reasons these DLL's are custom made include copyright issues, and that the original DLL's may be too big. Also, creating custom DLL's enables exact control of what should be done whenever a request for some action is issued to one of the DLL's. Below is a sourcecode excerpt from an example of a custom made KERNEL32.DLL:

```
;WINBASEAPI DWORD WINAPI GetModuleFileNameA (HMODULE
  hModule, LPSTR lpFilename, DWORD nSize);
;This is a standard function provided by the Windows operating system.
 GetModuleFileNameA:
   SIGNAL WIN32API      ;  Macro that informs SK about
                           the calling of this API
   push ebp             ;  The rest of the code performs
                           a dummy GetModuleFileNameA
   mov ebp, esp         ;
   push esi edi         ;
   mov edi, [ebp+12]    ;
   lea esi, [kernel32name] ;
   mov ecx, [ebp+16]    ;
   call copystring      ;
   pop edi esi          ;
   mov esp, ebp         ;
   pop ebp              ;
   retn 3*4             ;
   MACRO SIGNAL flag
   db 0Fh, 10H          ;  The 0fh, 10h combination is
```

-continued

| | | |
|---|---|---|
| dd flag | ; | as undefined opcode combination in Intel processors so far, and is as such open for use. When the emulator sees this combination, it |
| ENDM SIGNAL | ; | knows it is a message for the system kernel. |

This type of event notification function is vital for the system S.

The virtual DLL's communicate with the emulated Windows kernel drivers (E-I), and these again communicate with the underlying virtual DOS and VBIOS to access storage media. In one embodiment, a virtual kernel driver VREDIR.VXD (I) is designed to provide access to virtual Network Storage Devices. A special VHD (O) is set up as a network drive to provide detection of viruses and worms that spread over network resources, typically shared drives. This network drive is not accessible unless requests to it have passed through VREDIR.VXD (I), so it is as such virtually invisible for DOS and boot viruses. However, it is administrated and implemented exactly like the local VHD(s).

C: DOS executables are simple programs that depend on the DOS infrastructure to work. Whenever a DOS executable is examined, the VC contains the basic functions available to boot sector code, but on top of this there exists a virtual DOS operating system with emulated DOS interrupt services available (J) and other services including emulated standard file and disk services. Programs executed in this way will execute in virtual 16-bit mode.

D: Boot sectors are normally only executed once: at computer startup. At this time, only the hardware and ROM characteristics of the computer are known, so code run at this time will have to make do with only a few basic functions. Thus, in one embodiment, the VC contains only hardware characteristics and VBIOS services (K-M) whenever a boot sector sample is examined.

Actions that any programs (including viruses) may take on a file level will pass down though a chain of emulated responses until the actions are reflected on the virtual storage media (e.g., Local VHD (N), Network VHD (O) and Local VFD (P)). Files on these virtual storage devices may be infected.

System S Details

Bootstrap Process into the VOS MS-DOS in the System S

In one embodiment, when the system is initialized, the virtual CS:EIP is set to F000h:FFF0h, the virtual CR0 register is set to be in real mode, and the corresponding VBIOS code is emulated. This will in turn read the master boot sector (MBS) of the VHD, and emulation now proceeds on this MBS. This happens automatically, because the system S only emulates the natural transferrence of execution between BIOS and MBS. The MBS code will read the system boot sector (SBS), e.g., of the logical drive C: on the VHD, and emulation continues on this SBS. The SBS loads the file IO.SYS from the VHD's C: drive into memory address 0000h:7C00h, and an emulated jmp from the SBS starts the emulation of code in IO.SYS. This virtual file located on the VHD contains the core of the real-mode DOS support in the system S. When DOS is fully initialized, it will spawn the virtual file COMMAND.COM, also residing on the VHD. The COMMAND.COM will be executed using DOS interrupt 21h, service 4Bh as on a regular system, except that the starting and execution is fully emulated. COMMAND.COM will open a file logically residing on the VHD called "sample.exe". This is the program $P_{test}$ which is under investigation. COMMAND.COM will read some bytes from SAMPLE.EXE in order to decide what operating system it is meant for. If the target operating system is 32-bit Windows, COMMAND.COM will execute a virtual file called WIN.COM, which will start the VOS MS Windows95/98/ME (W9x).

Starting the VOS MS Windows95/98/ME in the System S

WIN.COM contains code to tell the emulator to switch to a protected mode. All tables (descriptor tables, interrupt tables etc) are generated before this switch occurs, after which the emulator is emulating protected mode 16-bit code. Now it will jump over to a newly created selector in the virtual GDT, which is set to have 4GB linear memory from base 0, 32-bit. Several drivers are needed to make the file system run, so WIN.COM issues an emulated V8086 task to load these drivers into the VC's real mode memory area, and transfer file data up where they belong, above C0000000h in the VC's linear memory space. The drivers (e.g., VMM.VXD, IFSMGR.VXD, VFAT.VXD, VWIN32.VXD) are initialized and the logical drive C: will be mounted using a simulated IFSMgr service.

The library virtual file KERNEL32.DLL is loaded (using an emulated V8086 task) from the VHD into the VC's memory. This library contains functions that will be exported to the executable program $P_{test}$. A function called WinExec is used to virtually run $P_{test}$ in this Windows environment. This function will open $P_{test}$, read it into the VC's memory and relocate it if necessary. Import functions expected by $P_{test}$ will be directed to entrypoints available from library (DLL) exports located in various virtual files residing on the VHD. These virtual files and the functions they contain are created for the system S specifically—no "ordinary" real world operating system components are present in this process. The program $P_{test}$ will now get control through an emulated jmp. The rest is now up to $P_{test}$.

The file system implemented is meant to match the actual file system implementation of Microsoft Windows 95/98/ME. Since it's written specifically for the system S, it will not be 100% accurate or complete, but it provides enough services to let a potential virus modify files on the VHD.

File System Implementation Under the VOS MS Windows 95/98/ME

In one embodiment, a virtual file KERNEL.32.DLL is provided. The virtual file KERNEL.32.DLL contains many functions that end up accessing files on the VHD. These calls are passed through the virtual file VWIN32.VXD (using an emulated PM_Callback) so it will have privilege level 0 (ring 0) capabilities on the VC. The VWIN32.VXD issues a protected mode interrupt 21h, which is hooked by the virtual IFSMgr driver. This driver sets up a request and passes it on to the IFSMgr's dispatch point, which is the same point IFSMGr_Ring0_FileIO services will call. This dispatch point creates an IFS request, and calls any file monitoring hook that has been installed by emulated programs (IFSMGr_InstallFileSystemAPIHook). The default hook in the VC calls the file system driver for the given operation; in the case of the described FAT file system this corresponds to services residing in the emulated VFAT driver. The VFAT driver issues emulated task switches to a V8086 task that again will call the DOS real-mode VOS to perform the actual IO towards the VHD.

DOS Executable Programs and the Windows Files' DOS Stub

Since Windows executables also hold a DOS stub enabling them to run under MS-DOS, this is also preferably emulated using the already installed virtual real-mode DOS. The tested program $P_{test}$ is executed in the virtual DOS using interrupt 21h, service 4Bh. Emulated control is thereby given to the code in.

Post-Run Tasks

When the emulated execution of the program P has ended, COMMAND.COM locates virtual files on the VHD and opens and closes them using emulated interrupt 21h calls. COMMAND.COM also tries to read/write the master boot sector on the VHD using emulated interrupt 13h services 2 and 3. When all files on the VHD have been accessed, COMMAND.COM terminates and gives control back to IO.SYS. IO.SYS "reboots" the VC by an emulated jmp to the VBIOS bootstrap routine. The VBIOS decides whether the scenario should be re-run.

Virtual Files

It is important to understand that the virtual files that are integral parts of the VOS only exist as files in the virtual (imagined) computer and are never represented on the real hard disk.

Software Modules (SM's) that Simulate Hardware Devices

SM_VHD: Hard Disk Storage Device

The SM provides a programming interface (API) to access sectors for read or write. Only the modules SM_VBIOS and SM_VIOMGR communicate directly with this module. The virtual hard disk is represented as a memory area that holds sector and file information, and it also has logging and notification capabilities (sectors read from/written to, files read from and written to). File systems supported at the time of writing includ FAT16, but can be extended to other file systems, such as, for example, FAT32, NTFS, Linux and others.

SM_VFD: Floppy Disk Storage Device

Same as for SM_VHD, with supported file systems including FAT12.

SM_VIOMGR: 10 Manager

SM_VIOMGR provides a simulated hardware port interface. This can be used to read or write sectors on SM_VHD and SM_VFD through simulated disk controllers, and also to access any other hardware port, for example, timer, CMOS settings and video/network cards.

SM_MEMMGR: Memory Manager

SM_MEMMGR provides a memory page that simulates a physical memory page on the VC. It can hold any linear address below 4GB, and linked lists are preferably used to find the translated linear to physical memory address. The SM_MEMMGR has logging and notification capabilities (memory read from/written to, etc.) This module provides access to VRAM and VROM.

SM_EMUL: CPU Emulator

The emulator is the CPU in the VC. It is a module that "executes" opcodes residing in the prefetch-queue (PFQ). Any effects from this execution are reflected within the VC's virtual memory or flag settings. The emulator performs a task switch, exception or trap inside the VC depending on any possible fault situation that occurs while executing an opcode.

Existing Software Modules (SM's) that Simulate Software

SM VBIOS: Basic Input Output System

The SM_VBIOS provides simulated interrupt 13h services. These can be used to read and write sectors on SM_VHD and SM_VFD. Other BIOS services are also available, including, for example, timer interrupts and others.

SM VOS: Operating System

The SM_VOS provides operating system components necessary to simulate a specific operating system, such as MS-DOS and Windows 95/98/ME, and additionally other operating systems, such as Windows NT/2000; Linux and OS/2.

SM_VF_XXX: Virtual Files

All files residing on the SM_VHD are created specifically for the system S, except the program $P_{test}$ under investigation. File names preferably match files names found in real world computers.

| Appendix A | Glossary and explanation of terms |
|---|---|
| S | System for detecting viruses and other damaging software in a simulated computer. |
| M | Method for detecting viruses and other damaging software in a simulated computer. |
| $P_{org}$ | Original program to be examined |
| $P_{test}$ | Program under test |
| Virtual | As typically used herein, virtual is used to denote emulated or simulated objects that behave similar to known real, non-simulated objects. It should be understood that virtual, as generally used herein, is not meant to be synonymous with, or cause confusion with, known usages of the word in normal computer terms; such as virtual memory. |
| SK | System Kernel. The governing program module in S. |
| VC | Virtual computer. In this setting, this generally means a software program that behaves like a real hardware computer. |
| VF | Virtual files residing on the virtual computer |
| VFa, VFb | Single virtual files on the VC |
| SM | Software module, part of S |
| VOS | Virtual Operating System |
| VHD | Virtual Hard Disk |
| VFD | Virtual Floppy Disk |
| VRAM | Virtual Random Access Memory |
| VROM | Virtual Read-Only Memory |
| MBS | Master Boot Sector. The first sector of physical hard disks. Contains the partition table. Not present on diskettes. |
| MBR | Master Boot Record. Synonymous with MBS. |
| SBS | System Boot Sector. The first sector of logical drives on hard disks and on diskettes. |

The present invention in certain aspects provides a virtual world powered by an emulator (CPU emulator), that allows possible virus-infected binary executables to 'run' as they would on a real system. When execution stops, the virtual system is analyzed for changes.

Since nothing runs on the real computer system, except an emulator, it is safe. Everything else is virtualized. Nothing is stored on the hard disk, even if the sample program being tested wants to. In certain aspects, the entire computer is virtualized. A new BIOS, CPU feature, OS fix, etc. are virtually applied, and several worlds (e.g., OSs) can be simulated in turn. Everything is controlled from the definition file. In certain aspects, the system runs inside the scanner engine on the computer/OS being supported, and detects the same viruses on the different platforms, even on accesses if desired.

In certain aspects, the present invention is useful to detect viruses like the ACG series. These viruses are metamorphic, and do not use any encryption to hide themselves. The virus body mutates from infection to infection, and there is no layer to decrypt to find any 'static' data to scan. ACG is complex, and it uses a lot of instructions to replicate to another goat file. Onel goal is make both ACG.A and ACG.B replicate recursively inside the scanner engine, which causes no other problem than time. On average, ACG.A uses 9,576,196 instructions per sample to infect a file. An initial goal is to make the system detect heuristically anything binary getting into the WildList.

What Resources Should Be Simulated?

In preferred aspects, the following parts of a are simulated to make a program under test (e.g., virus) believe it's running on a real system:

| | |
|---|---|
| Storage Device | Fixed disks of any size or layout. Initialized with a file system (logical drive C), including system and goat files prior to bootstrap process. |
| IO manager | Handles all I/O requests, and also has access to RAM. |
| ROM | Virtually Read-Only-Memory. Used to store BIOS code. |
| RAM | Initialized to a known value before bootstrap. Memory below 1 MB is paged linear, and memory above 1 MB is paged using linked lists. |
| User | A virtual user to control mouse and keyboard activity. E.g., sample values are pre-inserted to keyboard. |
| CPU | An emulator that can emulate any instruction including, for example, Multi Media eXtentions (MMX), floating point unit (FPU) etc. Flag handling, interrupt/exception/fault handling is also performed by the emulator. |

Since everything is virtual, and time is critical, it is desirable not to stop after every instruction to see what's going on. In one aspect of the present invention, the system tells you (e.g., poll) when something is happening, using, for example, reserved ports and values. Since the point is to make viruses replicate, and time is the most expensive resource, the system should try to stop as soon as possible if a clean program is being emulated. Many optimization techniques can be applied to make things go faster and avoid doing certain tasks, but the more weird logic used, the bigger the chance there is a virus out there that isn't detected because it's doing this—maybe even without knowing it.

An emulator provides the CPU functionality. In preferred aspects, a memory manager is provided to virtualize memory, e.g., 4 GB of memory, without using too much of the real memory or huge overhead when accessing memory. The memory manager should also understand differences between linear and physical memory, and how descriptors works.

The virtual storage device(s) can be a removable or a fixed media, or both, and can be partitioned into any logical size and file system. FAT 16 is preferably used as a default file system. One virtual storage device typically corresponds to one 'physical' disk connected. Inside each virtual storage device, partitions are made as on a regular system. There is no limit on how many 'physical' drives that can be connected.

Following is a sample layout of how a virtual drive C: may look according to one embodiment:

| FILENAME | | SIZE | CLUSTER | TIME | DATE | | |
|---|---|---|---|---|---|---|---|
| IO | .SYS | 008160 | 0002 | 15:30:44 | 12.05.2000 | \|___\| | archive |
| MSDOS | .SYS | 000007 | 0018 | 15:30:44 | 12.05.2000 | \|___\| | archive |
| WINDOWS | . | <DIR> | 0019 | 15:30:44 | 12.05.2000 | \|___\| | directory |
| FILEC | .COM | 004000 | 0020 | 15:30:44 | 12.05.2000 | \|___\| | archive |
| COMMAND | .COM | 004575 | 0028 | 15:30:44 | 12.05.2000 | \|___\| | archive |
| FILEA | .COM | 001002 | 0037 | 15:30:44 | 12.05.2000 | \|___\| | archive |
| FILEB | .COM | 002002 | 0039 | 15:30:44 | 12.05.2000 | \|___\| | archive |
| FILED | .COM | 016384 | 0043 | 15:30:44 | 12.05.2000 | \|___\| | archive |
| WIN | .COM | 005249 | 0075 | 15:30:44 | 12.05.2000 | \|___\| | archive |
| EDIT | .COM | 001002 | 0086 | 15:30:44 | 12.05.2000 | \|___\| | archive |
| FORMAT | .COM | 002002 | 0088 | 15:30:44 | 12.05.2000 | \|___\| | archive |
| FDISK | .COM | 004000 | 0092 | 15:30:44 | 12.05.2000 | \|___\| | archive |
| WINVER | .COM | 016384 | 0100 | 15:30:44 | 12.05.2000 | \|___\| | archive |
| GREP | .COM | 007023 | 0132 | 15:30:44 | 12.05.2000 | \|___\| | archive |
| MM | .COM | 005328 | 0146 | 15:30:44 | 12.05.2000 | \|___\| | archive |
| MEM | .EXE | 001000 | 0157 | 15:30:44 | 12.05.2000 | \|___\| | archive |
| XCOPY | .EXE | 002000 | 0159 | 15:30:44 | 12.05.2000 | \|___\| | archive |
| SETVER | .EXE | 004000 | 0163 | 15:30:44 | 12.05.2000 | \|___\| | archive |
| EMM386 | .EXE | 016920 | 0171 | 15:30:44 | 12.05.2000 | \|___\| | archive |
| NU | .EXE | 001000 | 0205 | 15:30:44 | 12.05.2000 | \|___\| | archive |
| SBCOPY | .EXE | 002000 | 0207 | 15:30:44 | 12.05.2000 | \|___\| | archive |
| MSD | .EXE | 004000 | 0211 | 15:30:44 | 12.05.2000 | \|___\| | archive |
| ED | .EXE | 016920 | 0219 | 15:30:44 | 12.05.2000 | \|___\| | archive |
| FMAP | .EXE | 016920 | 0253 | 15:30:44 | 12.05.2000 | \|___\| | archive |
| TOUCH | .EXE | 010754 | 0287 | 15:30:44 | 12.05.2000 | \|___\| | archive |
| SAMPLE | .EXE | 002626 | 0309 | 15:30:44 | 12.05.2000 | \|___\| | archive |

I/O ports should also be 'simulated'. Viruses tend to use timers in particular to generate random values for them. Some viruses read and write sectors directly to the hard disk talking to the hard-disk controller. This should be perfectly simulated if you want to catch all boot infectors. EGA/VGA/CRT ports are also used, but not by many viruses. These should return sensible data so legitimate executables can continue without problems.

SAMPLE.EXE is the SAMPLE FILE to be investigated, e.g., executed in the simulated environment. It's not really there. The directory structure is filled in, and the FAT information is correct. The generic storage device knows that the sectors belonging to the clusters of this file are file-based. On an access to read/write these clusters, it will be fetched from the physical file. If someone attempts to write to the same clusters (or expand it), a read/write copy the modified clusters will be stored in memory. Same goes for all the GOAT files. They are preferably READ-ONLY copies, coming from the definition file. Any attempt to modify them will preferably generate a new cluster that is READ-WRITE, on the same cluster, only the logical link internally is changed.

It's up to the operating system load to load the SAMPLE FILE into memory. Loading in certain aspects may depend on page faults, forcing pages to be loaded on real use (Protected Mode) or the entire file may be loaded at once (Real Mode). The operating system loader handles base relocations and import/export functionality.

The system should be restored 100% every run. This means that all 'resources' used must be fresh—every time. Since the system 'boots' for every replication attempt, the virtual BIOS sets the basic environment, like interrupts, BIOS data segment etc. The BIOS will then ask the CMOS what device to boot from. Normally this will be the physical drive 0x80. The MBS recognizes that a partition (drive C) exists using a known file system, and will boot. IO.SYS will be loaded, which in one aspect includes a real-mode 'DOS'. The operating system will initialize itself, hooking various interrupts, creating various tables (e.g., CDS, SFT, MCB, DEVICE DRIVERS, etc.).

It's important that every structure used matches the real world, because DOS is a very old and dissected platform, so many viruses go directly into structures/locations (e.g. SFT tables). All data modules are put into the definition file, so in one aspect, only the emulator is real code running inside the scanner engine. This makes the system very configurable, and offers the ability of creating multiple virtual worlds, and combinations of them. When done, it will try to spawn the default shell.

Since this system is non-user-interactive, a keyboard-chain is provided, but it only need be initialized with a fixed number of keystrokes. The keyboard ring can be read and written to. Mouse movements and other 'user' activity are also 'virtualized'. A monitor is 'connected', so viruses can write to the screen or use the video memory for whatever they like. The VIDEO memory is preferably redirected to another real MS-DOS-BOX to allow one to view the screen in a window—real time. The DOS supports some video APIs, and goes through the BIOS interrupt 0x10 to show things on screen. It's also a nice feature to show debug messages, or information about what a virus does; like the 'INT 21h being traced' message above. In one aspect, the INT 0x21 handler 'sees' that someone is tracing it, and prints the message, using standard interrupt 0x21, service 0x09.

What Operating System To Start?

The shell, COMMAND.COM, checks to see the format of the SAMPLE FILE to be investigated, and will either start it right away (e.g., service 0x4B/int 0x21), or it will start WIN.COM, which will start a version of the Windows 9× kernel, which is a non-GUI version.

The WIN.COM is preferably configured to set up all descriptor tables and enter protected-mode in ring 0, as well as set up all necessary structures required to continue. It will eventually load two VxDs, e.g., VMM and IFS. Theshell program is loaded as a ring 3 application, and the SAMPLE FILE is executed using the KERNEL32!WinExec. All WIN32 APIs are implemented in regular Dynamic Link Libraries (DLL) files (stored in the definition file). Inside KERNEL32, each API performs the given task. Many of them are configured to do nothing, just return. WinExec locates the file on the virtual storage device, fetches imports (if available), and gives control to the program. Since it may not be desirable to implement too many ways of opening a file, reading a file etc., ring 3 calls eventually come down to ring0. RING0_API's generate IFS packages, and follow the chain. The last receiver is an IFSMgr which performs the actual task by entering 'real mode', calling regular INT 0x21/0x13 from the DOS underneath Windows.

An example of an open file request from an application is as follows:

```
CreateFileA ("C:\GOAT1.EXE", GENERIC_READ or
GENERIC_WRITE,
...;
_IFSMgr_Ring0_FileIO (R0_OPENCREATE, "C:\GOAT1.EXE",
...,
ATTR_ARCHIVE );
FSD (C000111F, IFSFN_ OPEN, 3, IFSFH_RES_LOCAL, 0, 53835C);
INT 21 /AX=3D02 : open existing file : C:\GOAT1.EXE,
Handle 0005 |
CF=O
```

Regular file requests moves from ring3→4 ring0→real-mode and up again. Conversion of different status bits and addresses takes the most time to write.

RING0_functions are, before they are used, just an interrupt 0xCD 0x20 xx xx xx xx, in which the following DWORD shows which VxD should handle the request with what function. My INT 0x20 handler will do the same as the real INT 0x20 handler, and convert the OxCD 0x20 xx xx xx xx to an indirect CALL. (0xPF 0x15).

If the original Microsoft Windows 98 SE were used, the bootstrap process, loading vmm32.vxd, various DLLs, initializing PnP devices etc. would kill the emulator. It would take forever to 'boot', and the program would be useless outside the virus analysis lab.

In one aspect, the binary definition file (e.g., 600 KB) holds all signatures, virus information, disinfection information, system files, goat files etc. It would grow to enormous proportions if complete installation of DOS, Windows 98 SE, Linux and other platforms for simulation were included.

When the SAMPLE FILE has executed, and there still hasn't been any modification of binary executables (goats), the system should try to access files on the virtual drives. It will read and write the MBS. It will also do a find first/next, opening all *.COM and *.EXE files on the system using several opening methods. It will also try to execute them.

If nothing has happened, the driver reboots the system. The BIOS evaluates if it's necessary to allow the system to have another go. If no binary files were modified and none of the system's boot sectors were changed, there's no need. The emulation would go down the same path. If e.g. COMMAND.COM or the SBS/MBS was changed, the system is allowed another go.

Two-Step Replication

In order to know that an unknown virus is present, it needs to be replicated. If it replicates, the system still needs to know whether the new infection still will infect. One-step replication is not enough to filter off false positives or to be sure the system is dealing with a real-life virus. The system could be dealing with an executable that compresses files or marks them for any weird reason. After determining what files were modified in the first run, the system reinitializes to a clean state and these files (which used to be clean) are copied into the virtual system, one by one. If other 'clean' executable files now become 'dirty', the system is dealing with a virus. It's moved from the original sample to a file verified not to do viral behaviour. It then moved out of this file into other clean files.

It is not necessary to look at the sample to determine whether it's infectious, the system verified that by 'running' it. It doesn't matter what kind of virus it's in there. Whether they are plain simple, heavily encrypted or metamorphic, they still make previously clean files infectious.

Companion viruses don't modify the existing file, but create a new, normally hidden, file that holds the same name but another extension. Normal *.EXE files will get a *.COM companion. The system will also pick these up, and see whether an executable will create companions. If it does, the new companion must prove that it can recursively replicate in a clean sandbox.

What Can It Find?

An example of the results the system include the following:

| | |
|---|---|
| OK | File is 'clean', nothing alarming found. |
| MALWARE | File modified binary executables or boot sequence on the virtual storage device, but failed the recursive replication. |
| VIRUS | File contains a virus, which replicated recursively. |

The system may not be able to identify the virus, but it can feed information about what it did. This is probably more interesting for the virus analyst, but also the administrator might see this as valuable.

Since the program is already 'running' in the virtual system, detection of malware that would be harmful to your system is possible in the way that it:

removes/modifies already existing binary files attempts to reflash the BIOS (when it shouldn't)

alters important registry keys simply attempts to trash a disk drive.

Malware is not easy to define, but can include executables that do permanent damage to file or system.

The host program the virus is attached to, may have an impact on detection rates. If a memory resident virus restarts the host, and the host crashes/never terminates, the OS may not be able to tell what the resident portion would do. The virus will lay dormant in memory, and the 'drivers' will not get the chance of 'testing' whether a virus has gone resident. This problem has solutions. For example, once the OS sees that an executable has made the file system hooks, it can terminate the application in a matter of time if it doesn't terminate by itself.

Viruses are not always stable programs. They contain bugs, and some viruses are picky about what they infect, or when they want to do something. For example,     Viruses might execute the payload, and don't replicate     Viruses may not want to go resident     Viruses don't want to infect the goat flies     Viruses issue unknown APIs, interrupts, services or port requests.

Selection Of Goats

Goat files should be as small as possible, because it can be time-consuming to load big files. However, many viruses only replicate to files of certain sizes, contain relocations or other criteria to make replication harder. To overcome this, it is desirable to insert many different files on the virtual storage device. They don't need to be copied over each time, but logical links from the virtual storage device to the read-only copy in memory (definition file) can be made.

If viruses start modifying files, a read-write copy of that sector in memory is made, and the logical link redirected. In this way, the system doesn't do too much work for every physical file checked. A large number of flies can be present on the storage device without taking too many resources.

Information Extracted

Since the system has logged the virus activity, in one embodiment, it provides description of how the virus works, what it infects, whether it's companion or not, etc. If dates are retrieved by the virus, the system is configuredable to test the sample with various dates to see if the virus would carry any payload on a specific date.

Types of information provided/extracted by the system include, for example:

stealth: does the program 'hide' information when you ask for it via the OS and compare to the physical data?

memory resident: did it infect during execution of the sample or after? Did it install a file system hook via IFSMgr?

infects boot sectors: were they modified during execution of the sample?

which registry keys were altered to what?

which operating system files or library files were modified during execution? Did kernel32.dt1 or wsock32.dll change?

How did it infect files, could it be reversed to create cleaning scripts?

Could it have any hidden payload, did it get system date/time and not do any thing?

Boot Sector Viruses/Multi-Partite Viruses

In general, these viruses are replicated in the virtual system as well. In the system, there is also a drive unit 0, which corresponds to a regular floppy (A:). Viruses using either BIOS interrupt or talking directly to the floppy controller can infect this virtual floppy disk. If the floppy disk's boot sector has changed and no binary executables has changed, the CMOS will be set to boot from A:. If the hard disk system boot sector or master boot sector is now modified, it's safe to call the initial executable a virus.

Multi-partite viruses like Tequila, OneHalf etc., will modify the start up sequence of the computer, and wait for a boot to active the rest of the virus. The system driver will continue to search for a resident virus, but no files will be infected. It will therefore issue a reboot. The BIOS can 'see' that the SBS/MBS is modified, and allows another go for the system running the 'boot' portion of the virus. It will then infect the goat files, and these are again re-tested.

What About The Virtually Infected Files?

In one embodiment, the files can be exported from the system. These files are 'virtually' infected. Unless there are any bugs in the emulator, the kernels or the 'hardware' setup, this is what a regular infected goat would be like. There is no guarantee that it is so, and bugs can of course be around.

Preliminary Virus Analysis

For the virus analyst having a new virus in front of him, using the system of the present invention, the analyst can, in a matter of minutes, determine what it does and what it doesn't do. The system of the present invention is also a tool that can be used to replicate collections quickly. For example, in one embodiment the system uses approx. six hours on a 'OneOf' collection consisting of 18761 files, having a replication rate of approx. 71%, and detecting approx. 5% as malware.

| | |
|---|---|
| Total files | 00018761 |
| Time elapsed | 05:58:14 |
| Unknown malware | 00000917 (04.88%) |
| Unknown viruses | 00013409 (71.47%) |

On average, it replicates approx. ten samples of every virus it's able to replicate. These goat files never leaves the system.

In one embodiment, the system exports a log file from each infection, so a huge database of all replications of a collection can be made. It's easy then to search for specific events to end viruses using different techniques. Since this log file is on the interrupt service/API level, the log file need not be displayed since it might inspire people to start modifying viruses, or even write new ones. This system is designed to catch new and known viruses, not to help writing them.

Quality Assurance

All objects (files, memory and boot sectors) can be modified inside the system. If it is determined that the system is dealing with a virus, all instances of it can be detected using the system. All objects that are modified can be extracted to the real world. Memory scanning and disinfection can also be tested/created. The system memory can be scanned if dealing with a memory resident virus, and the virus removed. When/if this is achieved, another effort is made to 'infect' even more clean files inside the sandbox. It they can't be infected, memory is cleaned.

Sample Selection Of Viruses Replicated

A cross-section of different virus approaches, and how the system replication works for them is presented below:

CIH.1003 CIH is a resident Windows 9x/ME ring 0 virus. It will allocated memory through a VMM service, and install a file filtering hook. In this hook, it will follow all OpenFile calls, and infect using the RINGO-API files with the PE header format.

Basically the virus does two APIs to go resident, and will then re-start the host it infected. Any object performing a file I/O command will activate the virus. When the host program is terminated, control is passed back to KERNEL32!WinExec, which will return to the program requesting this application to run.

As a rule, the system driver performs a search on the virtual drive C:, for all executable files and perform an open. The find first/next, open & close are APIs exported from KERTTEL32.DLL. These calls will eventually come as IFS packages towards the IFSManager. If a virus now is resident, it might try to infect the file fm opening before the system get access to it.

This is the danger many scanners have today when scanning infected systems without doing a proper memory scan—you risk that all executable files on your system get infected while your scanning for viruses. Resident viruses like CIH must be unlinked from the file system and removed from memory before scanning any files.

CIH monitors the open process, and infects the file as it is opened.

Since a modified executable now exists, it is preferably re-tested in a clean system to verify that it will replicate in two generations. If the executable that was emulating wasn't a virus, the Windows would shut down, and the DOS would continue to verify the DOS stub of the PE file.

W95/Marburg.A: This is one of the first slightly polymorphic encrypted W95 viruses. It's direct action, meaning that it doesn't hook the file system. It will do all its harm when executed, and is not resident waiting for files to infected. Memory scan is not an issue with these viruses.

Marburg relies on many KERNEL32.DLL functions to work. It will locate these using Kernel32!GetProcAddress. It will delete some integrity-check files. It will then search your system for files to infect. If it finds one, it will memory map it using KERNEL32 functions. Basically it will infect the file in memory, and commit the changes to disk when done. It will use two APIs to write back bytes into the original host's process memory, and jump back to restart the host.

The process of detecting a virus like this doesn't make arty changes to the basic logic. When execution of the sample is completed, binary executables are already modified and are ready for re-testing for recursive replication.

Dark_Paranoia.5554/5572: An old DOS virus using the CPU's ability to single step using INT 1. Each instruction the virus executes is decrypted before execution and encrypted again after execution. Thus one will never 'see' the virus unencrypted, but scanners do have techniques to detect these viruses exact. This type of virus doesn't pose a problem.

Level-3: This entire series of viruses causes no problem to replicate. Level-3 is really polymorphic, and goes resident in the system. It infects files on close and execute in the system.

Hare. 7786: Here is one of the viruses talking directly to the hard-disk controller to infect the MBS on your hard-disk. It also tries to delete your \WINDOWS\SYSTEM\IOSUBSYS\HSFLOP.PDR. It goes resident in the system, and infects files using several writes.

The Next Steps . . .

In one embodiment, when a mail coming through a gateway system holding an attachment, the attachment is 'virtually executed' in the system, and is stamped as a virus. The scanner engine will immediately start working out detection & disinfection. If it succeeds, the attachment will be cleaned, and the mail continues through. If it can't, it's deleted. The next time the same attachment comes through, the scanner has a signature to detect it, and already knows whether it can be disinfected or not. Everything necessary to do so is already located on the machine—nothing needs to be transmitted to any lab for analysis.

Since all events that have happened during infection of an executable are logged, in most cases, it is possible to create automatic disinfection. The system can determine where read/writes were done, into what logical areas the what file, etc. The system also knows how the original files looked like.

When the scanner engine thinks it managed to make the disinfection algorithm, it can try it on the 'virtually infected files'. If these files don't turn out as the 'clean goats' they were prior to being infected, disinfection has failed, and the system can try again. In many cases, 100% disinfection is not possible and the system must be aware of this.

If the disinfection succeeds, the script used for disinfection is added to the signature and stored as well.

Worms pose threats that are bigger than any regular file infector. Using the Internet/open shares, worms can propagate to hundreds of users in minutes. How can one protect against unknown mass-mailers that don't use regular file replication? If 'something' has modified e.g. WINSOCK32.DLL, the Windows driver will attempt to send a mail out to the Internet. Of course, there is no Internet, but as far as the virtual computer/network believes, there is one. The mail is sent using WINSOCK/MAPI, and it should arrive to the my kernel in the same fashion it was sent, or else 'someone' has tampered with it. If it suddenly holds an attachment, it's alarming. If arty mail is coming through without the system sending one, it's also alarming.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of testing a program in a virtual environment to determine whether the program includes damaging software or a virus, the method comprising:
providing a simulated computer system in a real computer system, the simulated computer system including software modules for simulating resources including hardware devices and software;
executing a program under test, $P_{test}$, in the simulated computer system until a stop condition occurs; and
determining whether a simulated resource has been written to or accessed, and if so, reassigning $P_{test}$ to be at least a portion of a simulated resource that was written to or accessed, and thereafter re-executing $P_{test}$ in the simulated computer system until a stop condition occurs; and determining whether re-execution of $P_{test}$ causes a similar action or whether the simulated computer is unbootable, wherein if both steps of determining show the same or a similar result, the program under test is identified as including a virus, wherein if the simulated computer is unbootable upon re-execution, the program under test is identified as including damaging software, and wherein otherwise the program under test is identified as not containing damaging software or a virus.

2. The method of claim 1, wherein a stop condition includes one of a natural program termination, and one or more exceptions triggered by the emulated program.

3. The method of claim 1, wherein the simulated resources include a simulated storage device.

4. The method of claim 3, wherein the step of determining includes determining whether the simulated storage device has been written to, and if so setting $P_{test}$ to be the portion of the simulated storage device that was written to.

5. The method of claim 3, wherein the step of determining includes determining whether one of a simulated file (SF), a simulated master boot sector (SMBS) and a simulated system boot sector (SSBS) has been written to, and if so setting $P_{test}$ to be at least a portion of the SF, SMBS or-SSBS that was written to.

6. The method of claim 1, the simulated resources include a virtual network device, and wherein the step of determining includes determining whether an attempt has been made to transfer a file using the virtual network device, and if so setting $P_{test}$ to be at least a portion of the file.

* * * * *